Jan. 16, 1962 K. O. SPEED ETAL 3,016,618
ADJUSTABLE MEASURING INSTRUMENT
Filed Oct. 21, 1960
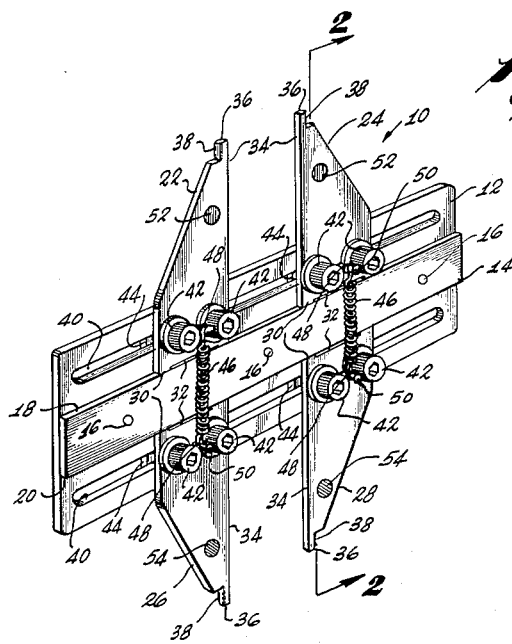
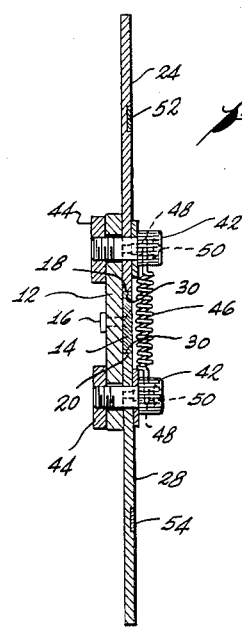
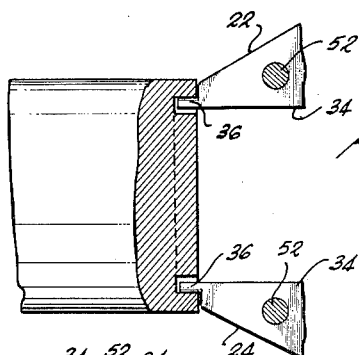
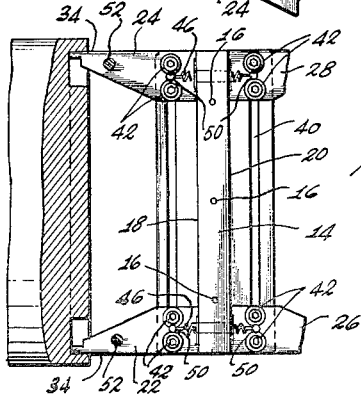
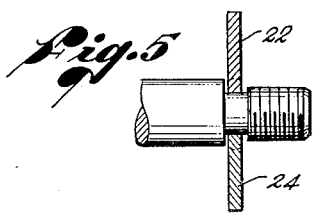
INVENTORS
KENNETH O. SPEED
LAWRENCE A. WILSON
BY
Lilly & Nyhagen
ATTORNEYS

United States Patent Office 3,016,618
Patented Jan. 16, 1962

3,016,618
ADJUSTABLE MEASURING INSTRUMENT
Kenneth O. Speed, 1035 137th Place, Hawthorne, Calif., and Lawrence A. Wilson, 3817½ Moore St., Los Angeles 66, Calif.
Filed Oct. 21, 1960, Ser. No. 64,112
7 Claims. (Cl. 33—143)

This invention deals generally with measuring instruments and, more particularly, with an improved, adjustable gauge for checking inside and outside dimensions.

The present illustrative embodiment of the invention is intended to be used as a so-called "go-no go" gauge. It will become evident as the description proceeds, however, that this illustrative embodiment, as well as the invention in general, is not limited to this particular use.

A general object of the invention is to provide an improved, adjustable gauge of the character described.

A more specific object of the invention is to provide an adjustable gauge of the character described which is characterized by simplicity of construction, economy of manufacture, accuracy of measurement, and ease of use.

Another object of the invention is to provide an adjustable gauge of the character described which is ideally suited for use as a go-no go gauge.

A further object of the invention is to provide an adjustable gauge having adjustable gauging arms which are spring loaded for accurate alignment thereof as well as retention of the arms in alignment while they are being locked in adjusted positions.

Yet a further object of the invention is to provide an adjustable gauge of the character described which is sturdy and yet compact and light in weight, pleasing in appearance, easy to manipulate, and otherwise ideally suited to its intended uses.

Other objects, advantages, and features of the invention will become readily evident as the description proceeds.

The invention will be best understood from the following detailed description of a presently preferred embodiment thereof which is illustrated in the attached drawing, wherein:

FIG. 1 is a perspective view of the present instrument;
FIG. 2 is a section taken along line 2—2 on FIG. 1;
FIG. 3 illustrates one use of the instrument;
FIG. 4 illustrates another use of the instrument; and
FIG. 5 illustrates how the instrument is used to check thread reliefs.

The measuring instrument or gauge 10 illustrated in this drawing comprises a body 12 which is shown in the form of a base plate. Rigid on this base plate is a central, upstanding guide member or rib 14. Rib 14 could be formed integrally with the base plate but is shown as a separate piece which is rigidly fastened to the base plate in some convenient way, such as by rivets 16.

Guide rib 14 has opposite, parallel, longitudinal edge surfaces 18 and 20. As will shortly be seen, these edge surfaces function as, and, therefore, will be hereinafter referred to as, bearing surfaces.

Slidably supported on the base plate at one side of the guide rib 14 are a first pair of cooperating gauging arms 22 and 24. These arms are identical and are mounted on the gauge in mirror image relation, either as shown in FIG. 1 or in FIG. 4. Slidably supported on the base plate at the other side of the guide rib 14 are a second pair of cooperating gauging arms 26 and 28. These latter arms are also identical to one another and to the gauging arms 22 and 24 and, in the manner of the latter arms, are mounted in mirror image relation.

Each gauging arm will be observed to have a generally right angle triangular configuration. One side of the triangle of each arm is defined by a base edge 30 on the arm. This edge is adapted to slidably seat against the adjacent bearing surface 18 or 20 of the guide rib 14. The central portion of each base edge is preferably relieved, as shown at 32, to permit accurate flat seating engagement of each base edge with its respective guide rib bearing surface.

Each gauging arm has a first gauging edge 34 which is disposed at a right angle to the base edge 30 of, and defines a second side of, the triangle of the respective gauging arm. This gauging edge extends from the base edge to the tip 36 of the respective gauging arm.

Tip 36 of each gauging arm is relatively narrow and is bounded on one side by the outer end portion of the gauging edge 34 and on the other side by a second, short gauging edge 38 which is parallel to the adjacent gauging edge 34.

The gauging arms are independently adjustable along the guide rib 14 to vary the spacing between the cooperating gauging arms of each pair of such arms. Releasable lock means are provided for locking the gauging arms to the base plate 12, in a fixed position along the guide rib 14, as follows: At each side of the guide rib 14, the base plate has a slot 40 parallel to the guide rib. Each slot underlies the adjacent pair of gauging arms and is substantially coextensive with the guide rib. Extending through each gauging arm and loosely through the adjacent slot 40 are a pair of lock bolts 42, such as socket head cap screws. At the underside of the base plate, opposite each gauging arm, is a nut plate 44 in which the bolts of the opposed gauging arm are threaded. Thus, each gauging arm can be locked in a fixed position along the guide rib by tightening its respective lock bolts and released for adjustment along the guide rib by releasing these lock screws. The loose fit of the lock screws in the base plate slots permits the base edge 30 of each gauging arm to seat flat against its respective bearing surface 18 or 20 of the guide rib when its lock screws 42 are released.

The accuracy of the present instrument is primarily dependent on this flat seating of each gauging arm on the guide rib so that the gauging edges 34 and 38 on the arms will be exactly parallel. For this reason, each of the gauging arms 22, 24 of the first pair of arms is yieldably connected to the corresponding gauging arm 26 or 28 of the other pair of arms by means of a spring 46, i.e., arm 22 is connected to arm 26 and arm 24 is connected to arm 28. The connected gauging arms are thus constantly urged toward the guide rib 14 to assure flat seating engagement of the base edges 30 of the arms against their respective guide rib bearing surfaces 18, 20. The springs, however, allow relative adjustment of the pairs of gauging arms.

Each end of each spring 46 is connected to the adjacent gauging arm by means of terminal hooks or loops 48 on the springs which engage over pins 50 fixed to the gauging arms. These connections are, in effect, rotary connections which permit the angular relationship of the springs and gauging arms to change freely during adjustment of the arms, as is necessary to prevent binding of the parts. Also, these connections are releasable, i.e., the ends of the springs can be disengaged from the pins 50, to facilitate placing the gauging arms either in the positions of FIG. 1 or in the positions of FIG. 4.

It will be observed that the point of connection of each spring to its respective gauging arms is between the lock bolts 42 and the ends of the base edges 30 of the arms, whereby the springs are effective to hold the latter flat against the guide rib, as just mentioned.

The gauge described above can be used with the gauging arms set as in FIG. 1 for external measurements or as in FIG. 4 for inside measurements. The narrow gauging tips 36 of the arms permit measurements to be taken in narrow grooves, as shown in FIG. 3.

In use of the illustrated instrument as a go-no go gauge, one pair of gauging arms, say, arms 22, 24, are set at a given "go" spacing or dimension between their gauging edges 34 and arms 26, 28 are set at a given "no-go" dimension between their gauging edges 34 in the well-known way. These may be either internal dimensions, in which case the gauging arms are placed and used as in FIG. 4, or external dimensions, in which case the arms are placed and used as in FIG. 1. If only the narrow gauging tips 36 are used, as in FIG. 3, of course, both inside and outside dimensions may be checked with either placement of the gauging arms.

The gauge is then engaged with a workpiece, in the well-known way, to ascertain whether the dimension to be checked falls within the tolerance established by the preset go and no-go adjustment of the gauge. If desired, the gauging arms may bear red and green dots 52 and 54 for indicating the "go" gauging arms and "no-go" gauging arms, respectively.

FIG. 5 illustrates how the present instrument is uniquely suited to check thread reliefs because of the thinness of the gauging arms. Since the arms must be thin for this latter application, they must be afforded with the necessary rigidity in some other way. In the illustrative instrument, the arms are provided with the required rigidity by their triangular configuration.

As mentioned earlier, the springs 46 constantly maintain the gauging arms in flat seating engagement with the guide rib 14 to assure constant parallelism between the gauging edges 34, 38 of the several gauging arms, as is necessary to the accuracy of the instrument. These springs also retain the gauging arms in position while the lock screws for the arms are being set so that a particular adjustment or setting of the arms is not upset by tightening of the screws. The springs, then, constitute a highly important feature of the invention.

Only one use of the gauge has been described, namely, its use as a go-no go gauge. Obviously, however, the gauge is capable of other measuring applications.

Clearly, therefore, the invention disclosed herein is fully capable of attaining the objects and advantage preliminarily set forth.

What is claimed is:

1. A measuring instrument comprising a body including an elongate guide member having opposite, parallel, longitudinal bearing surfaces, a first pair of cooperating gauging arms at one side of and independently adjustable along the guide member, a second pair of cooperating gauging arms at the other side of and independently adjustable along the guide member, each gauging arm extending transversely of the guide member and having a base edge slidably seating against the adjacent bearing surface of the guide member, a spring connected between each gauging arm of the first pair of gauging arms and the corresponding gauging arm of the second pair of gauging arms for retaining said base edges of the gauging arms seated flat against their respective bearing surfaces of the guide member, and releasable means for locking each gauging arm in a fixed position along the guide member.

2. A measuring instrument comprising a base plate including a central, upstanding guide rib having opposite, parallel, longitudinal bearing surfaces, a first pair of cooperating gauging arms on the base plate at one side of and adjustable along the guide rib, a second pair of cooperating gauging arms on the base plate at the other side of and adjustable along the guide rib, each gauging arm extending transversely of the guide rib and having a base edge slidably seating against the adjacent bearing surface of the rib, a spring connected between each gauging arm of the first pair of gauging arms and the corresponding gauging arm of the other pair of gauging arms for yieldably retaining said base edges of the gauging arms seated flat against their respective bearing surface of the guide rib, and releasable means for locking each arm to the base plate to retain the respective arm in a fixed position along the guide rib.

3. The subject matter of claim 1 wherein each gauging arm has a generally triangular configuration, said base edge of each gauging arm defining one side of its respective triangle and each gauging arm having a gauging edge extending at right angles to its respective base edge and defining another side of its respective triangle.

4. A measuring instrument comprising a base plate including a central, upstanding guide rib having opposite, parallel, longitudinal bearing surfaces, a first pair of cooperating gauging arms on the base plate at one side of and adjustable along the guide rib, a second pair of cooperating gauging arms on the base plate at the other side of and adjustable along the guide rib, each gauging arm extending transversely of the guide rib and having a base edge slidably seating against the adjacent bearing surface of the rib, said base plate having a first slot at one side of and parallel to the guide rib and underlying the first pair of arms and a second slot at the other side of and parallel to the guide rib and underlying the second pair of arms, a nut plate at the underside of the base plate opposite each gauging arm, a pair of lock screws carried by each gauging arm extending through the adjacent slot and threaded in the adjacent nut plate for locking the respective arm to the base plate in a fixed position along the guide rib, and a spring connected between each gauging arm of the first pair of gauging arms and the corresponding gauging arm of the second pair of gauging arms at positions on the arms intermediate the lock screws of the respective arms for retaining said base edges of the gauging arms seated flatly against their respective bearing surfaces.

5. The subject matter of claim 4 wherein each gauging arm has a generally triangular configuration, the base edge of each gauging arm defining one side of its respective triangle and each gauging arm having a first gauging edge normal to its respective base edge and defining another side of its respective triangle, and a relatively narrow gauging tip bounded on one side by said gauging edge and on the other side by a second gauging edge parallel to the first gauging edge.

6. A measuring instrument comprising a body including an elongate guide member having opposite, parallel, longitudinal bearing surfaces, a first pair of cooperating gauging arms at one side of and independently adjustable along the guide member, a second pair of cooperating gauging arms at the other side of and independently adjustable along the guide member, each gauging arm extending transversely of the guide member and having a base edge slidably seating against the adjacent bearing surface of the guide member, a spring extending between each gauging arm of the first pair of gauging arms and the corresponding gauging arm of the second pair of gauging arms, and a releasable connection between each end of the spring and the adjacent gauging arm.

7. The subject matter of claim 6 wherein each of said releasable connections comprises a pin fixed in each gauging arm, and a loop on the adjacent end of the respective spring rotatably and releasably fitting over the respective pin.

No references cited.